(12) United States Patent
Rhee

(10) Patent No.: US 8,381,638 B1
(45) Date of Patent: Feb. 26, 2013

(54) GRILL CONFIGURATION HAVING A FORCED AIR CURTAIN AND ITS ASSOCIATED METHOD OF OPERATION

(76) Inventor: Kyung Tai Rhee, Highland Park, NJ (US)

( * ) Notice: Subject to any disclaimer, the term of this patent is extended or adjusted under 35 U.S.C. 154(b) by 1631 days.

(21) Appl. No.: 11/520,539

(22) Filed: Sep. 14, 2006

(51) Int. Cl.
*A22C 7/00* (2006.01)
*A23P 1/00* (2006.01)
*A47J 43/18* (2006.01)

(52) U.S. Cl. .......................................... 99/426; 99/467

(58) Field of Classification Search .................... 99/426; 126/21 R, 25 R, 299 D, 299 R
See application file for complete search history.

(56) References Cited

U.S. PATENT DOCUMENTS

| | | | | |
|---|---|---|---|---|
| 4,813,397 A | | 3/1989 | Yamada | 126/299 |
| 4,884,554 A | | 12/1989 | Yanagida | 126/21 |
| 2005/0103212 A1 | * | 5/2005 | Cronin et al. | 99/467 |
| 2005/0279371 A1 | * | 12/2005 | Billard et al. | 131/185 |
| 2007/0023420 A1 | * | 2/2007 | Gagas | 219/623 |

* cited by examiner

*Primary Examiner* — Tu B Hoang
*Assistant Examiner* — Lindsey C. Teaters
(74) *Attorney, Agent, or Firm* — LaMorte & Associates P.C.

(57) ABSTRACT

A grill assembly that uses a forced air curtain to limit smoke emissions from the grill. The grill assembly had a housing with an open top. A heat source is provided in the housing. A grilling surface is disposed in the housing between the open top and the heat source. A first fan is provided. The first fan directs air through an air curtain manifold to create an air curtain of forced air. The air curtain of forced air extends horizontally across the open top of the grill housing. Any smoke created by the cooking of food rises up until it contacts the air curtain of forced air. The smoke either remains trapped below the air curtain or passes into the flow of the air curtain.

13 Claims, 1 Drawing Sheet

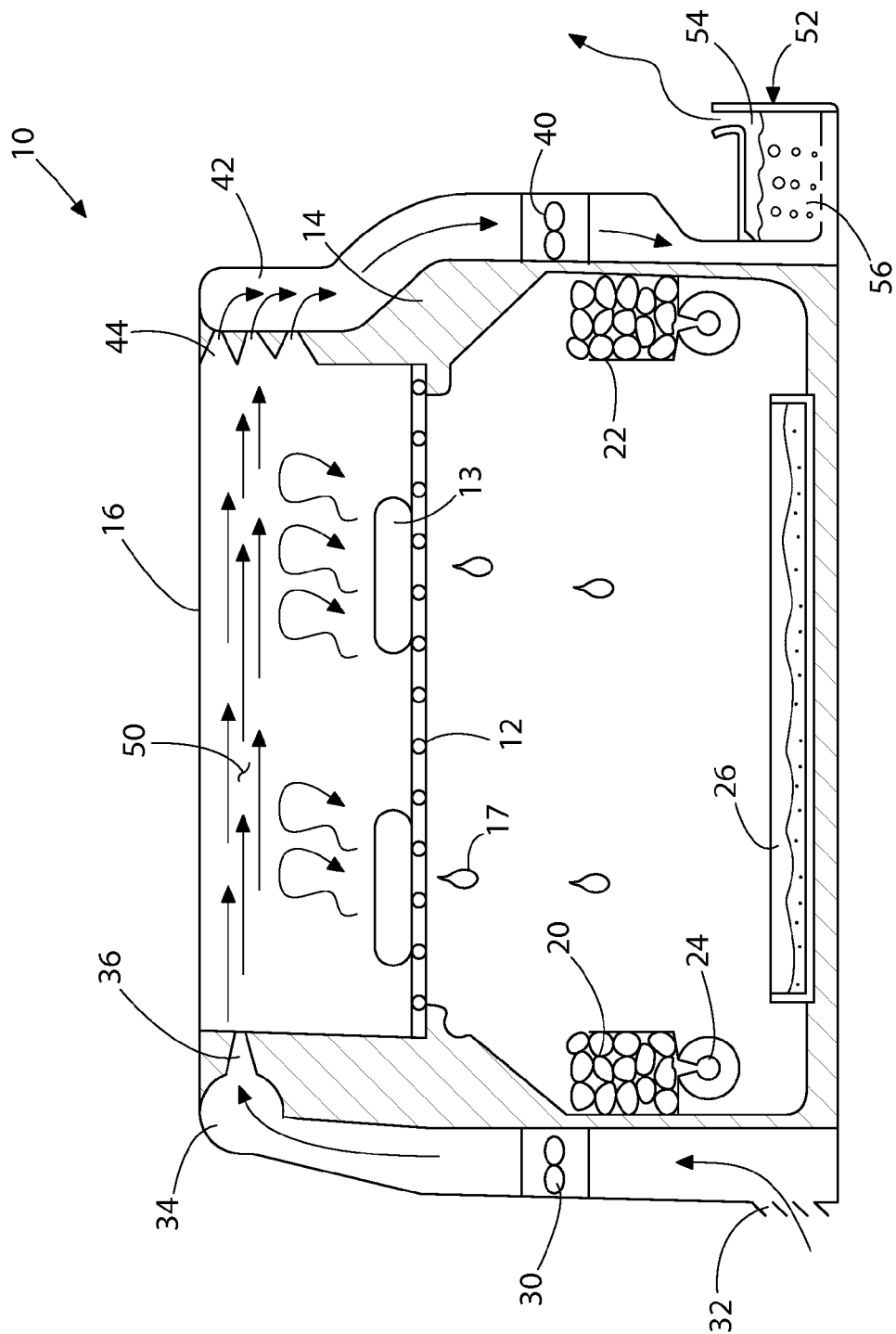

GRILL CONFIGURATION HAVING A FORCED AIR CURTAIN AND ITS ASSOCIATED METHOD OF OPERATION

BACKGROUND OF THE INVENTION

1. Field of the Invention

In general, the present invention relates to cooking grills, such as barbecue grills and hibachi grills. More particularly, the present invention relates to grills that have forced air ventilation systems.

2. Prior Art Description

Open flame cooking grills, such as barbecue grills, cook food over an exposed flame. As the food cooks, drippings from the food fall away from the food. As drippings separate from the food, some of the dripping are vaporized by the heat of the open flame and become part of the exhaust smoke. The exhaust smoke surrounds the cooking food, therein providing the food with added flavor components.

Since cooking over an open flame allows fats and other drippings to separate from the cooking food, grilled food tends to contain less fat than baked foods or fried foods. Furthermore, due to the added flavoring from the exhaust smoke, grilled food tends to have better flavors than its baked or fried counterparts.

The one disadvantage of grilling food is the large amount of exhaust smoke produced during cooking. The same smoke that adds flavor to the food also prevents many grills from being used indoors. Unless a kitchen has a large capacity ventilation system, open flame grills are unsafe. Typically, only commercial kitchens and high-end domestic kitchens have large volume ventilation systems sufficient to support an open flame grill. Accordingly, most people who want to cook over an open flame grill must cook outdoors. If the weather is bad or the outdoor temperature uncomfortable, then the benefits of cooking on the grill must be weighed against the inconvenience of cooking outside.

Recognizing that people like to grill and would like to grill indoors, various range top manufacturers have produced cooking ranges with open flame grills. Such ranges are placed below large vent hoods or have side vents that draw away smoke with powerful fans. Open flame grills with side vents that draw smoke are exemplified by U.S. Pat. No. 4,884,554 to Yanagida and U.S. Pat. No. 4,813,397 to Yamade, entitled Charcoal Fired Smokeless Roaster. The problem associated with such side vent grills is that the food must be covered in order to direct the smoke toward the side vents. As soon as the cover is removed from the food, the smoke rises directly upwardly and bypasses the ventilation system. Since many people prefer to grill with the food uncovered and accessible, such side ventilation grills have had little commercial success.

A need therefore exists for an open flame grill that can be properly ventilated without a large overhead ventilation system and without requiring that the cooking food be constantly covered. This need is met by the present invention as described and claimed below.

SUMMARY OF THE INVENTION

The present invention is a grill assembly that uses a forced air curtain to limit smoke emissions from the grill. The grill assembly utilizes a grill housing having an open top. The open top is not obstructed by any lid or cover. A heat source is provided in the grill housing. A grilling surface is disposed in the grill housing between the open top and the heat source.

A first fan is provided. The first fan directs air through an air curtain manifold to create an air curtain of forced air. The air curtain of forced air extends horizontally across the open top of the grill housing. Any smoke created by the cooking of food rises up until it contacts the air curtain of forced air. The smoke either remains trapped below the air curtain or passes into the flow of the air curtain. The smoke drawn into the air curtain is received by the intake manifold. The intake manifold passes the air through a filter and allows the air to vent.

BRIEF DESCRIPTION OF THE DRAWINGS

For a better understanding of the present invention, reference is made to the following description of an exemplary embodiment thereof, considered in conjunction with the accompanying drawings, in which:

FIG. 1 is a schematic showing the components of an exemplary embodiment of the present invention grilling assembly.

DETAILED DESCRIPTION OF THE DRAWINGS

Although the present invention cooking grill can be part of a larger cooking range, it can also be produced as a stand-alone unit. In the exemplary embodiment, the grill is described as a stand-alone unit for the sake of clarity. However, the exemplary stand-alone embodiment should not be considered a limitation. It will therefore be understood that the cooking grill can be embodied in a range top or oven that also has conventional cooking surfaces.

Referring to FIG. 1, a grill assembly 10 is shown. The grill assembly 10 has grilling bars 12 upon which food 13 is placed to be cooked. The grilling bars 12 are placed inside a grill housing 14. The grill housing 14 has an open top 16. The grilling bars 12 are adjustable in position, but are preferably between three inches and twelve inches below the open top 16 of the grill housing 14. In this manner, any food placed upon the grilling bars 12 is readily visible and accessible through the open top 16 of the grill housing 14.

Heat sources 20 are positioned inside the grill housing 14. The heat sources 20 are positioned below the level of the grilling bars 12, but are preferably not positioned directly under the grilling bars 12. In this manner, any drippings 17 from food 13 cooking on the grilling bars 12 will not fall directly into the heat source 20.

The heat source 20 can be propane burners, natural gas burners, electric heating elements or charcoal receptacles. In the shown embodiment, the exemplary heat sources 20 are charcoal receptacles 22 that are ignited by a propane gas jet 24. In this manner, lighter fluid need not be used to start the charcoal burning. If it is not desirable to use real charcoal, heating rocks can be placed into the charcoal receptacles 22, wherein the propane gas jet 24 heats the rocks and the rocks radiate heat.

The heat sources 20 are oriented and shielded so that the radiant heat they produce is generally distributed in an even manner under the grilling bars 12. This provides a cooking surface of uniform heat.

A water tray 26 is positioned directly under the grilling bars 12. The water tray 26 receives any drippings 17 from food 13 cooking on the grilling bars 12, thereby preventing such drippings 17 from burning and smoking. Since the heat sources 20 are offset and the water tray 26 is under the grilling bars 12, it will be understood that drippings 17 from the cooking food 13 will not burn and smoke. Thus, the exhaust smoke produced by the grill assembly 10 is greatly reduced.

A supply fan 30 and an exhaust fan 40 are provided on opposite sides of the grill housing 14. Both the supply fan 30 and the exhaust fan 40 are strong, high velocity fans. As will be explained, it is preferred that the exhaust fan 40 have a larger capacity than does the supply fan 30.

The supply fan 30 draws in ambient air through an inlet port 32. The supply fan 30 directs air into an air curtain manifold 34. The air curtain manifold 34 is located along the open top 16 of the grill housing 14. The air curtain manifold 34 has shaped nozzles 36 that aim air horizontally directly across the open top 16 of the grill housing 14.

An intake manifold 42 is positioned on the opposite side of the open top 16 of the grill housing 14. The intake manifold 42 has intake ports 44 that face the nozzles 36 of the air curtain manifold 34. Consequently, the air blown out of the nozzles 36 of the air curtain manifold 34 are mostly received by the intake ports 44 of the intake manifold 42.

The intake manifold 42 is connected to the exhaust fan 40. The exhaust fan 40 draws air from the intake manifold 42. It will therefore be understood that the air being blown out horizontally by the nozzles 36 of the air curtain manifold 34 is being drawn in by the exhaust fan 40 via the intake manifold 42. By providing an exhaust fan 40 that is stronger than the supply fan 30, it will be understood that air is drawn into the intake manifold 42 faster than air can be supplied by the air curtain manifold 34. Consequently, the intake manifold 42 has the ability to suck in the exhaust smoke from inside the grill housing 14 in addition to the air flowing out of the air curtain manifold 34.

The nozzles 36 of the air curtain manifold 34 and the intake ports 44 of the intake manifold 42 line opposite sides of the open top 16 of the grill housing 14. The orientation causes air from the nozzles 36 to flow horizontally across the open top 16 of the grill housing 14. The horizontal flow of air creates an air curtain 50 across the open top 16 of the grill housing 14.

The air curtain 50 traps smoke inside the grill housing 14. This allows the smoke to contact and flavor the food 13 that is cooking. Any smoke with enough energy to penetrate the air curtain 50 is carried by the air curtain 50 into the intake manifold 42. As such, very little heat and smoke escapes through the open top 16 of the grill housing 14. However, other than the flow of air that forms the air curtain 50, there are no physical obstacles impairing access to the cooking food 13. The food 13 can therefore be observed, poked, prodded, flipped and adjusted at will.

Although the heat sources 20 and water tray 26 are arranged to minimize smoke, some smoke inevitably is created during cooking. The smoke rises up in the grill housing 14 until it contacts the air curtain 50. The smoke is drawn by the air curtain 50 into the intake manifold 42.

Air and smoke is drawn into the intake manifold 42 by the exhaust fan 40. The exhaust fan 40 can be coupled directly to an outside vent. However, in the shown embodiment a bubble filter 52 is used. The exhaust fan 40 draws the air and smoke collected in the intake manifold 42 through the bubble filter 52. The bubble filter 52 is a reservoir 54 filled with water 56. The air and smoke enters the bubble filter 52 at the bottom of the reservoir 54, wherein the smoke and air bubble up through the water 56. As air and smoke bubble through water 56, the air and smoke are cooled. Vaporized fats congeal. Furthermore, particulate matter, such as soot, becomes trapped in the water 56. The air leaving the bubble filter 52 is therefore significantly cooler and cleaner than the air that enters the bubble filter 52. The end product exhaust air, therefore, can be either released into the surrounding air or vented away.

It will be understood that the embodiment of the present invention that is illustrated and described is merely exemplary and that a person skilled in the art cam make many variations to the shown embodiment using functionally equivalent components. For instance, the shape and size of the grill housing is a matter of design choice. Furthermore, the heat source can be placed under the grilling bars if protected by drip shields. All such variations, modifications and alternate embodiments are intended to be included within the scope of the present invention as claimed.

What is claimed is:

1. A cooking grill assembly, comprising:
   a grill housing having an open top;
   a heat source disposed within said grill housing;
   a grilling surface disposed in said grill housing below said open top and at an elevation above said heat source;
   an air inlet port for receiving ambient air from outside said grill housing;
   a nozzle;
   a first fan for drawing said ambient air in through said air inlet port and exhausting said ambient air through said nozzle, wherein said nozzle directs said ambient air horizontally across said open top of said grill housing, therein creating an air curtain of forced air that extends across said open top;
   an intake port for receiving said air curtain of forced air;
   an exhaust port; and
   a second fan for drawing said air curtain of forced air into said intake port and exhausting said air curtain of forced air outside of said grill housing though said exhaust port.

2. The assembly according to claim 1, further including a filter for filtering air drawn through said intake manifold by said second fan.

3. The assembly according to claim 2, wherein said filter is a water bubble filter.

4. The assembly according to claim 1, wherein said second fan has a larger capacity than said first fan.

5. The assembly according to claim 1, wherein said heat source is offset from said grilling surface.

6. The assembly according to claim 1, further including a water tray disposed in said grill housing below said grilling surface.

7. A grill assembly, comprising:
   a horizontally flowing air curtain of forced air;
   a grilling surface disposed below said air curtain of forced air;
   a heat source that directs heat under said grilling surface;
   an air inlet port for receiving ambient air from outside said grill housing;
   an output manifold;
   a first fan for drawing said ambient air in through said air inlet port and directing said ambient air through said output manifold, therein producing said air curtain of forced air;
   an exhaust port;
   an intake manifold for receiving said air curtain of forced air and exhausting said air curtain of forced air outside of said grill housing though said exhaust port.

8. The assembly according to claim 7, further including a second fan that draws air into said intake manifold.

9. The assembly according to claim 7 further including a filter for filtering air drawn through said intake manifold.

10. The assembly according to claim 7, further including a mechanism for cooling air drawn through said intake manifold.

11. The assembly according to claim 7, wherein said heat source is offset from said grilling surface.

12. A method, comprising the steps of:
    providing a grill housing having an open top;
    providing a heat source and a grilling surface inside said grill housing;

providing air inlet port for receiving ambient air from outside said grill housing;

providing an output manifold on one side of said open top;

providing a first fan that draws said ambient air in through said air inlet port and directs said ambient air through said output manifold to create a stream of air;

providing an intake manifold on a side of said open top opposite said output manifold;

providing an exhaust port;

providing a second fan that draws said stream of air into said intake manifold and directs said stream of air to said exhaust port, therein creating an air curtain of forced air between said intake manifold and said output manifold across said open top of said grill housing.

13. The method according to claim 12, further including the step of filtering said air curtain of forced air received by said intake manifold.

\* \* \* \* \*